United States Patent
Inoue et al.

(10) Patent No.: US 6,921,568 B2
(45) Date of Patent: Jul. 26, 2005

(54) OPTICAL RECORDING MEDIUM

(75) Inventors: Hiroyasu Inoue, Chuo-Ku (JP); Hideki Ishizaki, Chuo-Ku (JP); Hiroshi Takasaki, Chuo-Ku (JP); Hideki Hirata, Chuo-Ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/834,181

(22) Filed: Apr. 29, 2004

(65) Prior Publication Data

US 2004/0202895 A1 Oct. 14, 2004

Related U.S. Application Data

(63) Continuation of application No. PCT/JP02/12223, filed on Nov. 22, 2002.

(30) Foreign Application Priority Data

Nov. 22, 2001 (JP) ........................................ 2001-357160

(51) Int. Cl.$^7$ .................................................. B32B 3/02
(52) U.S. Cl. .................... 428/64.1; 428/64.4; 428/64.5; 428/64.6; 430/270.13
(58) Field of Search .............................. 428/64.1, 64.4, 428/64.5, 64.6, 913; 430/270.13, 495.1, 945

(56) References Cited

U.S. PATENT DOCUMENTS

| | | | |
|---|---|---|---|
| 5,368,986 A | * | 11/1994 | Terao et al. ............ 430/270.12 |
| 6,096,400 A | | 8/2000 | Inoue et al. |
| 6,115,351 A | | 9/2000 | Utsunomiya et al. |
| 6,146,733 A | | 11/2000 | Inoue et al. |
| 6,192,024 B1 | | 2/2001 | Inoue et al. |
| 6,231,945 B1 | * | 5/2001 | Miyamoto et al. ......... 428/64.1 |
| 6,537,721 B2 | | 3/2003 | Inoue et al. |

FOREIGN PATENT DOCUMENTS

| | | |
|---|---|---|
| JP | 62-51049 | 3/1987 |
| JP | 64-784444 | 3/1989 |
| JP | 1-92365 | 4/1989 |
| JP | 2-239437 | 9/1990 |
| JP | 3-35439 | 2/1991 |
| JP | 5-144085 | 6/1993 |
| JP | 7-262613 | 10/1995 |
| JP | 8-63784 | 3/1996 |
| JP | 10-326436 | 12/1998 |
| JP | 11-232698 | 8/1999 |
| JP | 11-328730 | 11/1999 |
| JP | 11-339314 | 12/1999 |
| JP | 2000-30314 | 1/2000 |
| JP | 2000-331378 | 11/2000 |
| JP | 2002-157737 | 5/2002 |

OTHER PUBLICATIONS

U.S. Appl. No. 10/834,181, filed Apr. 29, 2004, Inoue et al.

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

The optical recording medium of the invention comprises a recording layer and at least one mixed dielectric layer. The mixed dielectric layer contains cerium oxide and an additive compound. The additive compound is at least one compound selected from among aluminum oxide, chromium oxide, iron oxide, manganese oxide, niobium oxide, magnesium oxide, zinc oxide, titanium oxide, yttrium oxide, tantalum oxide, antimony oxide, zirconium oxide, bismuth oxide and magnesium fluoride. The optical recording medium has a high storage reliability and satisfactory recording/reading characteristics.

2 Claims, 1 Drawing Sheet

LASER BEAM ↓

↑ LASER BEAM

OPTICAL RECORDING MEDIUM

CROSS-REFERENCES TO RELATED APPLICATIONS

This application is a continuation of International PCT Application No. PCT/JP02/12223, filed on Nov. 22, 2002 which claims priority to Japanese patent application No. JP 2001-357160 in the Japanese Patent Office.

TECHNICAL FIELD

This invention relates to optical recording media such as phase change media and the like.

BACKGROUND ART

Great attention is now paid to optical recording media capable of high density recording and erasing the once recorded information for rewriting. Among such rewritable optical recording media, phase change recording media are designed such that recording is performed by irradiating a laser beam to a recording layer to change its crystalline state and reading is performed by detecting the change of reflectance of the recording layer associated with that state change. The phase change optical recording media are of greater interest because the drive unit may have a simple optical system as compared with that used for magneto-optical recording media.

For the phase change recording layer, calcogenide materials such as Ge—Sb—Te are often used because of a greater difference in reflectance between the crystalline and amorphous states and a relatively high stability in the amorphous state.

When information is recorded in a phase change optical recording medium, the recording layer is irradiated with a laser beam having a high power (recording power) sufficient to heat the recording layer at or above its melting point. In the region where the recording power is applied, the recording layer is melted and then rapidly cooled, forming a recorded mark in the amorphous state. The recorded mark is erased by irradiating the recording layer with a laser beam having a relatively low power (erasing power) sufficient to heat the recording layer above its crystallization temperature, but below its melting point. The recorded mark to which the erasing power is applied is heated above the crystallization temperature and then slowly cooled, resuming the crystalline state. Therefore, the phase change optical recording medium allows for overwriting simply by modulating the intensity of a single laser beam.

In order to increase the recording density and transfer rate of a recording medium, attempts have been made to reduce the wavelength of recording/reading light, to increase the numerical aperture of an objective lens in a recording/reading optical system, and to increase the linear velocity of the medium. The diameter of a spot that is defined on the surface of the recording layer by a recording laser beam is represented by λ/NA wherein λ is the wavelength of the laser beam and NA is the numerical aperture. The spot diameter λ/NA divided by the linear velocity V of the medium, i.e., (λ/NA)/V gives the time of irradiation of laser beam to the recording layer, that is, the time taken for passage across a beam spot. As the recording density and transfer rate increase, the irradiation time of laser beam to the recording layer becomes shorter and shorter. This makes it difficult to optimize overwriting conditions.

Problems arising from overwriting at an increased linear velocity are discussed below.

An increased linear velocity leads to a shortened irradiation time of recording light. It is then a common practice to increase the recording power in proportion to the increased linear velocity for preventing the heated temperature of the recording layer from lowering. However, an increased linear velocity entails an increased cooling rate following irradiation of recording light. To form amorphous recorded marks, the recording layer once melted by irradiation of recording light must be cooled at a rate above a certain level corresponding to the crystallization rate. If the construction of the recording layer and the thermal design of the medium are the same, the cooling rate of the recording layer depends on the linear velocity. That is, the cooling rate becomes faster at higher linear velocities and becomes slower at lower linear velocities.

On the other hand, to erase the amorphous recorded mark (to recrystallize), an erasing beam must be irradiated such that the recording layer may be held for at least a predetermined time at a temperature between the crystallization temperature and the melting point. The attempt to increase the erasing power in proportion to the increased linear velocity for preventing the heated temperature of the recording layer from lowering has a less likelihood to erase the recorded mark because the irradiation time is reduced as a result of the increased linear velocity.

Therefore, to increase the linear velocity for improving the data transfer rate, the recording layer must be formed of a composition having a relatively high crystallization speed such that recrystallization is completed within a relatively short time (as disclosed in JP-A 1-78444 and JP-A 10-326436), or the medium must have the structure (slow cooling structure) that prevents heat release from the recording layer. Also, as described in JP-A 7-262613 and JP-A 8-63784, it is believed that the medium is preferably provided with a slow cooling structure for preventing any drop of recording sensitivity by an increased linear velocity.

DISCLOSURE OF THE INVENTION

In this regard, the inventors discovered that a rapid cooling structure that permits rapid heat release from the recording layer is preferred for overwriting at a high transfer rate (see Japanese Patent Application No. 2001-109137).

FIG. 1 illustrates one exemplary construction of a phase change optical recording medium. The medium of FIG. 1 includes a reflective layer 5, a second dielectric layer 32, a phase change recording layer 4, a first dielectric layer 31, and a light-transparent substrate 2 stacked successively on a support substrate 20 in the described order. A recording/reading beam enters the recording layer 4 through the light-transparent substrate 2. In the prior art, the reflective layer 5 is generally constructed of aluminum or an aluminum-base alloy, and the second dielectric layer 32 is generally constructed of ZnS—SiO$_2$.

The inventors found that for the medium to take a rapid cooling structure, the reflective layer 5 and/or second dielectric layer 32 in FIG. 1 is preferably formed of a material having a high thermal conductivity. Specifically, it was found preferable that the second dielectric layer 32 is formed of Al$_2$O$_3$ or SiO$_2$, and the reflective layer 5 is formed of silver or a silver-base alloy.

However, it was found that when the second dielectric layer 32 is formed of Al$_2$O$_3$ or SiO$_2$, the medium somewhat loses storage reliability on account of a likelihood of separation between the second dielectric layer 32 and the recording layer 4 when the medium is stored under hot humid conditions. On the other hand, it was found that when the second dielectric layer 32 is formed of ZnS—SiO$_2$ and the reflective layer 5 is formed of silver or a silver-base alloy to prevent such separation, the reflective layer 5 can be corroded through reaction of silver in the reflective layer 5 with sulfur (S) in the second dielectric layer 32, which adversely affects recording/reading characteristics.

An object of the present invention is to provide an optical recording medium having a high storage reliability and satisfactory recording/reading characteristics.

This and other objects are attained by the present invention which is defined below as (1) to (5).

(1) An optical recording medium comprising a recording layer and at least one mixed dielectric layer containing cerium oxide and an additive compound, wherein said additive compound is at least one compound selected from the group consisting of aluminum oxide, chromium oxide, iron oxide, manganese oxide, niobium oxide, magnesium oxide, zinc oxide, titanium oxide, yttrium oxide, tantalum oxide, antimony oxide, zirconium oxide, bismuth oxide and magnesium fluoride.

(2) The optical recording medium of (1), wherein when the contents of aluminum oxide, chromium oxide, iron oxide, manganese oxide, niobium oxide, magnesium oxide, zinc oxide, titanium oxide, yttrium oxide, tantalum oxide, antimony oxide, zirconium oxide, bismuth oxide, magnesium fluoride and cerium oxide in said mixed dielectric layer are calculated as $Al_2O_3$, $Cr_2O_3$, $Fe_3O_4$, $Mn_3O_4$, $Nb_2O_5$, MgO, ZnO, $TiO_2$, $Y_2O_3$, $Ta_2O_5$, $Sb_2O_3$, $ZrO_2$, $Bi_2O_3$, $MgF_2$, and $CeO_2$, respectively, the molar ratio of said additive compound to the total of cerium oxide and said additive compound is 10 to 80%.

(3) The optical recording medium of (1) or (2), wherein a first dielectric layer, said recording layer, and a second dielectric layer are disposed in order, and at least part of the first dielectric layer and/or at least part of the second dielectric layer is constructed by said mixed dielectric layer.

(4) The optical recording medium of any one of (1) to (3), wherein at least one of said mixed dielectric layer is in contact with said recording layer.

(5) The optical recording medium of any one of (1) to (4), further comprising a reflective layer containing silver, at least one of said mixed dielectric layer is in contact with said reflective layer.

BEST MODE FOR CARRYING OUT THE INVENTION

Figure 1:
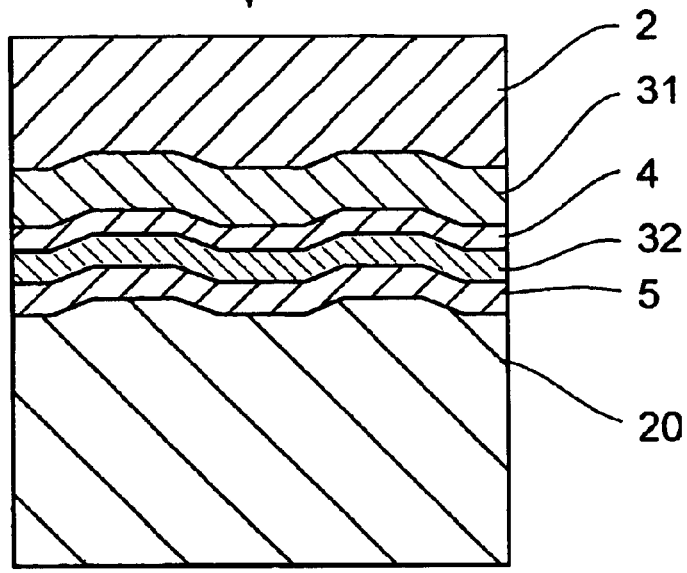
FIG. 1 is a partial cross-sectional view showing one exemplary construction of an optical recording medium.

In connection with the medium structure shown in FIG. 1, the inventors sought for the material of which the second dielectric layer 32 is formed that has a higher thermal conductivity than ZnS—SiO$_2$, minimizes the likelihood of separation between the second dielectric layer 32 and the recording layer 4, and can prevent corrosion of silver when the reflective layer 5 is formed of silver or a silver-base alloy, and as a result, found that cerium oxide is preferred. It was also found that when at least the region of the first dielectric layer 31 in contact with the recording layer 4 is formed of cerium oxide, the heat dissipation from the recording layer 4 is facilitated and the likelihood of separation between the first dielectric layer 31 and the recording layer 4 is suppressed.

However, it was found that when a dielectric layer is formed by a sputtering method using a target of cerium oxide, the dielectric layer tends to crack. Cracks in the dielectric layer cause recording/reading errors thereat.

Continuing research works, the inventors have found that the generation of cracks in the dielectric layer during deposition can be prevented by using a sintered target made of a mixture of cerium oxide and a specific compound (referred to as "additive compound" herein) added thereto.

When a mixed dielectric layer containing cerium oxide and the additive compound is disposed in contact with the recording layer 4, the likelihood of separation between the mixed dielectric layer and the recording layer 4 is restrained even when stored under hot humid conditions. Also, when the mixed dielectric layer is disposed in contact with the reflective layer 5 made of silver or a silver-base alloy, it protects the reflective layer 5 from corrosion. Further, the mixed dielectric layer is unlikely to crack during deposition by sputtering. Moreover, the refractive index of the mixed dielectric layer can be controlled over a wide range by altering the mix ratio of cerium oxide to the additive mixture, facilitating the optical design of the medium.

The minimized likelihood of separation of the mixed dielectric layer from the recording layer is accomplished when the recording layer is made of a metal or alloy. The recording layer made of a metal or alloy includes, for example, a phase change recording layer composed mainly of Sb and Te, a phase change recording layer having an approximate composition to $Ge_2Sb_2Te_5$ (atomic ratio), and a magneto-optical recording layer made of a rare earth-transition element alloy. It is noted that there is a strong likelihood of separation between the recording layer and the dielectric layer when thermal impact is applied. Then the present invention is effective especially to phase change media wherein the recording layer can be heated to 200 to 600° C. upon initialization (crystallization) or recording.

Meanwhile, JP-A 1-92365 describes a cerium oxide composition for vacuum deposition or sputtering in which one or more of titanium oxide, yttrium oxide, aluminum oxide, tantalum oxide, antimony oxide, magnesium fluoride, zirconium oxide and bismuth oxide are mixed with cerium oxide in an amount of 0.5 to 50% by weight of the mixture. This composition embraces the sputtering composition used in the present invention in which some of the aforementioned additive compounds are mixed with cerium oxide. It is described in the cited publication that when cerium oxide is used as a target to be sputtered, the target can be broken or crazed because cerium oxide is weak to thermal impact, and the invention of the cited publication aims to overcome this and other drawbacks.

However, as to the field of application, the cited publication merely describes that said cerium oxide composition is used for the formation of transparent, high refractive index, multilayer films in the optical and opto-electronics fields, whereas the application to dielectric layers in optical recording media is referred to nowhere. Also the cited publication does not refer to chromium oxide, iron oxide, manganese oxide, niobium oxide, magnesium oxide and zinc oxide among the additive compounds used in the present invention.

Structure of FIG. 1

FIG. 1 shows one exemplary construction of the optical recording medium of the invention. The optical recording medium includes a reflective layer 5, a second dielectric layer 32, a phase change recording layer 4, a first dielectric layer 31, and a light-transparent substrate 2 stacked successively on a support substrate 20 in the described order. A recording/reading laser beam enters the recording layer 4 through the light-transparent substrate 2. An intermediate layer of dielectric material may be disposed between the support substrate 20 and the reflective layer 5. The construction of each component of this medium is described below.

First and Second Dielectric Layers 31 and 32

These dielectric layers prevent oxidation and quality change of the recording layer 4. The provision of these dielectric layers also improves the degree of modulation. The first dielectric layer 31 protects the light-transparent substrate 2 by blocking the heat transferred from the recording layer 4 upon recording or allowing the heat to escape in an in-plane direction. The second dielectric layer 32 has the function of cooling the recording layer 4 by allowing the heat transferred from the recording layer 4 upon recording to escape to the reflective layer 5.

The thicknesses of the first and second dielectric layers 31 and 32 are determined as appropriate so as to provide sufficient cooling, protecting, and modulation improving effects. Usually, the first dielectric layer 31 preferably has a thickness of 30 to 300 nm, more preferably 50 to 250 nm, and the second dielectric layer 32 preferably has a thickness of 2 to 50 nm. It is noted that the second dielectric layer 32 should preferably have a thickness of not more than 30 nm, more preferably not more than 25 nm, in order to provide a rapid cooling structure.

The preferred dielectric materials used in the first and second dielectric layers 31 and 32 are, for example, compounds containing at least one metal component selected from among Si, Ge, Zn, Al and rare earth elements. The compound is preferably an oxide, nitride or sulfide, and a mixture containing two or more of these compounds is also useful.

In the invention, at least part of the first dielectric layer 31 and/or at least part of the second dielectric layer 32 is constructed by a mixed dielectric layer containing cerium oxide and an additive compound.

The additive compound is at least one compound selected from among aluminum oxide, chromium oxide, iron oxide, manganese oxide, niobium oxide, magnesium oxide, zinc oxide, titanium oxide, yttrium oxide, tantalum oxide, antimony oxide, zirconium oxide, bismuth oxide and magnesium fluoride. The invention achieves better effects when use is made of aluminum oxide or magnesium oxide among others.

In the mixed dielectric layer, the molar ratio of the additive compound to the total of cerium oxide and the additive compound is preferably 10 to 80% and more preferably 20 to 60%. If this molar ratio is too low, the addition effect of the additive compound becomes insufficient. On the other hand, too high a molar ratio leads to a likelihood of separation between the mixed dielectric layer and the recording layer 4.

The molar ratio of the additive compound in the mixed dielectric layer can be determined by the following procedure. First, the contents of respective metal elements contained in the mixed dielectric layer are determined. The metal element content can be determined by x-ray fluorescence analysis, electron probe x-ray microanalysis (EPMA), Auger electron spectroscopy or the like. Then, the molar ratio of the additive compound is calculated provided that the metal elements are present in the mixed dielectric layer as compounds having a stoichiometric composition. That is, the molar ratio is calculated provided that aluminum oxide, chromium oxide, iron oxide, manganese oxide, niobium oxide, magnesium oxide, zinc oxide, titanium oxide, yttrium oxide, tantalum oxide, antimony oxide, zirconium oxide, bismuth oxide and cerium oxide are present in the form of $Al_2O_3$, $Cr_2O_3$, $Fe_3O_4$, $Mn_3O_4$, $Nb_2O_5$, MgO, ZnO, $TiO_2$, $Y_2O_3$, $Ta_2O_5$, $Sb_2O_3$, $ZrO_2$, $Bi_2O_3$, $MgF_2$, and $CeO_2$, respectively.

The mixed dielectric layer should preferably consist of cerium oxide and the additive compound although it may contain at least one of other compounds. Understandably, the total content of the other compounds should preferably be equal to or less than 30 mol % of the entire mixed dielectric layer since too high contents of other compounds may detract from the advantages of the invention. It is preferred to avoid inclusion of sulfides such as ZnS because sulfides can interfere with the advantages of the invention. It is noted that the molar percent is calculated provided that the other compounds are present as compounds having a stoichiometric composition.

In the invention, the first dielectric layer 31 in entirety and/or the second dielectric layer 32 in entirety may be constructed by the aforementioned mixed dielectric layer. Alternatively, the first dielectric layer 31 and/or the second dielectric layer 32 may be constructed as a structure having at least two dielectric sub-layers stacked, and at least one of the sub-layers is the aforementioned mixed dielectric layer. In either embodiment, as long as the mixed dielectric layer is in contact with the recording layer 4, the likelihood of separation between the recording layer 4 and the mixed dielectric layer is suppressed even during storage under hot humid conditions; and as long as the mixed dielectric layer is in contact with the silver-containing reflective layer 5, the likelihood of corrosion of the reflective layer 5 is suppressed.

Each dielectric layer is preferably formed by a sputtering method.

Support Substrate 20

The support substrate 20 is provided to maintain the rigidity of the medium. The support substrate 20 usually has a thickness of 0.2 to 1.2 mm, preferably 0.4 to 1.2 mm, and may be either transparent or opaque. The support substrate 20 may be formed of a resin like conventional optical recording media although it may also be formed of glass. Grooves (or guide channels) often formed in optical recording media can be provided by transferring grooves in the support substrate 20 to the layers formed thereon, as shown in the figure. The groove is a region which is relatively on the nearer side as viewed from the recording/reading light incident side, while a land is a region that separates two adjacent grooves.

Reflective Layer 5

The material of which the reflective layer is made is not particularly limited and may be a metal or metalloid such as Al, Au, Ag, Pt, Cu, Ni, Cr, Ti, Si, etc. alone or an alloy containing at least one of the foregoing. Since the dielectric layer-forming material in the invention is selected so as to provide a medium of rapid cooling structure, the reflective layer is preferably formed of a material having a high thermal conductivity compliant to the rapid cooling structure. The preferred material having a high thermal conductivity is silver or a silver-base alloy. However, it is preferred to add to silver an element for corrosion resistance improvement since silver in elemental form fails to provide sufficient corrosion resistance. In the medium of the structure shown in FIG. 1, the reflective layer on the laser beam-incident side tends to increase surface roughness on account of grain growth during formation of the reflective layer. The increased surface roughness leads to increased read noise. It is then preferred to reduce the grain size in the reflective layer. It is thus preferred to add an additive element to silver rather than to use silver in elemental form, for the purpose of reducing the grain size in the reflective layer or forming the reflective layer as an amorphous layer.

The auxiliary element to be added to silver is preferably at least one element selected from among Mg, Pd, Ce, Cu, Ge, La, Sb, Si, Te and Zr, for example. These auxiliary elements are used alone or preferably in admixture of two or more. The content of the auxiliary element in the reflective layer is preferably 0.05 to 2.0 at %, more preferably 0.2 to 1.0 at %, for each element. The total of auxiliary elements is preferably 0.2 to 5 at %, more preferably 0.5 to 3 at %. Too low an auxiliary element content achieves insufficient addition effect thereof whereas too high an auxiliary element content results in a lower thermal conductivity.

It is noted that the reflective layer lowers its thermal conductivity as its grain size becomes smaller. Then, the reflective layer which is amorphous makes it difficult to acquire a sufficient cooling rate upon recording. In a preferred embodiment, once the reflective layer is formed as an amorphous layer, it is crystallized by heat treatment. The layer which is once formed as an amorphous layer and then crystallized maintains the surface roughness inherent to the amorphous state and accomplishes an improvement in thermal conductivity by virtue of crystallization.

Usually, the reflective layer preferably has a thickness of 10 to 300 nm. A thickness below the range is difficult to provide a sufficient reflectance. A thickness beyond the range provides only a little improvement in reflectance and is disadvantageous in cost. The reflective layer is preferably formed by vapor phase deposition methods such as sputtering and evaporation.

Recording Layer 4

The composition of the recording layer is not particularly limited. Notably, overwriting must be performed at a high linear velocity in order to increase a data transfer rate. To this end, the recording layer should preferably have so high a rate of transition from the amorphous to the crystalline state that amorphous recorded marks can be erased (or crystallized) within a brief time. To this end, a composition based on Sb and Te and having a relatively high Sb content is preferred.

Since a recording layer consisting solely of Sb and Te has a relatively low crystallization temperature of about 130° C. and insufficient storage reliability, it is preferred to add another element in order to elevate the crystallization temperature. The additional element used herein is preferably at least one element selected from among In, Ag, Au, Bi, Se, Al, P, Ge, H, Si, C, V, W, Ta, Zn, Ti, Sn, Pb, Pd and rare earth elements (Sc, Y and lanthanoids). Of these, at least one element selected from among rare earth elements, Ag, In and Ge is more preferred because of their superior storage reliability-improving effect.

The preferred composition of the recording layer is represented by the formula (I):

$$(Sb_xTe_{1-x})_{1-y}M_y \qquad \text{I}$$

wherein M is an element other than Sb and Te, x and y representative of atomic ratios are preferably in the range:

$0.2 \leq x \leq 0.90$, and $0 \leq y \leq 0.25$, and more preferably $0.55 \leq x \leq 0.85$, and $0.01 \leq y \leq 0.20$.

Formation of the recording layer from the preferred composition facilitates to increase the data transfer rate.

Light-Transparent Substrate 2

The light-transparent substrate 2 is transparent so that recording/reading light is transmitted thereby. The light-transparent substrate 2 used herein may be a resin or glass plate having approximately the same thickness as the support substrate 20. As noted above, the present invention is effective especially when high density recording is desired. Therefore, the light-transparent substrate 2 is preferably made thin in order to accomplish a high recording density by way of an increased NA of the recording/reading optical system. Specifically, the thickness of the light-transparent substrate is preferably selected from the range of 30 to 300 μm. If the light-transparent substrate is too thin, dust deposited on the light-transparent substrate surface has a more detrimental optical influence. On the other hand, if the light-transparent substrate is too thick, it becomes difficult to accomplish a high recording density by way of an increased NA.

The light-transparent substrate 2 is made thin in various ways. For example, a light-transparent sheet of transparent resin may be attached to the first dielectric layer 31 with any of various adhesives and pressure-sensitive adhesives to form a light-transparent substrate. Alternatively, a transparent resin layer may be formed directly on the first dielectric layer 31 utilizing a coating technique, to form a light-transparent substrate.

Figure 2:
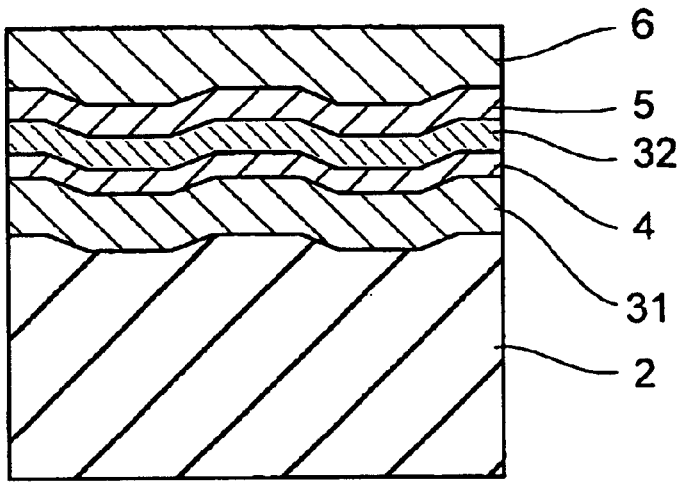
FIG. 2 is a partial cross-sectional view showing another exemplary construction of an optical recording medium.

Structure of FIG. 2

The optical recording medium shown in FIG. 2 includes a first dielectric layer 31, a recording layer 4, a second dielectric layer 32, a reflective layer 5, and a protective layer 6 stacked successively on a light-transparent substrate 2 in the described order. Recording/reading light enters the recording layer 4 through the light-transparent substrate 2.

Even in the structure shown in FIG. 2, the advantages of the invention are obtained by controlling the composition of the second dielectric layer 32 according to the invention.

The light-transparent substrate 2 in FIG. 2 may be of the same material as the support substrate 20 in FIG. 1, but must be transparent to light.

The protective layer 6 is provided for improving mar resistance and corrosion resistance. The protective layer is preferably formed of various organic materials, especially radiation-curable compounds or compositions thereof which are cured with radiation such as electron beams or UV radiation. The protective layer usually has a thickness of about 0.1 to 100 μm and may be formed by conventional techniques such as spin coating, gravure coating, spray coating, and dipping.

The remaining layers are the same as in the construction of FIG. 1.

EXAMPLE

Example 1

Sample No. 1

An optical recording disk sample of the structure shown in FIG. 1 was prepared by the following procedure.

The support substrate 20 used was a disk-shaped polycarbonate having a diameter of 120 mm and a thickness of 1.1 mm in which grooves were formed simultaneous with injection molding.

The reflective layer 5 was formed in an argon atmosphere by a sputtering process. The target used was $Ag_{98}Pd_1Cu_1$. The reflective layer 5 was 100 nm thick.

The second dielectric layer 32 was formed in an argon atmosphere by a sputtering process using a composite target of $CeO_2$—$Al_2O_3$. The composite target had the composition of $CeO_2$:$Al_2O_3$=80:20 (molar ratio). The second dielectric layer 32 was 12.5 nm thick.

The recording layer 4 was formed in an argon atmosphere by a sputtering process using an alloy target. The recording layer 4 had the composition (atomic ratio):

$$(Sb_xTe_{1-x})_{1-y}M_y \qquad \qquad \text{I}$$

wherein M=In and Ge in a ratio of 1:5, x=0.78, and y=0.06. The recording layer was 12 nm thick.

The first dielectric layer 31 was formed in an argon atmosphere by a sputtering process using a target of ZnS (80 mol %) and $SiO_2$ (20 mol %). The first dielectric layer 31 was 130 nm thick.

The light-transparent substrate 2 was formed by bonding a polycarbonate sheet of 100 μm thick to the surface of the first dielectric layer 31.

Sample No. 2 (Comparison)

It was prepared by the same procedure as sample No. 1 except that the second dielectric layer 32 was formed solely of $CeO_2$ and its thickness was 12 nm.

Sample No. 3 (Comparison)

It was prepared by the same procedure as sample No. 1 except that the second dielectric layer 32 was formed solely of $Al_2O_3$ and its thickness was 20 nm.

Evaluation

The recording layer of each sample was initialized (or crystallized) by means of a bulk eraser, after which the sample was set on an optical recording medium testing apparatus where signals were recorded under conditions:

laser wavelength λ:405 nm, numerical aperture NA:0.85, linear velocity:5.3 m/s, and bit length:0.12 μm.

Next, the recorded signals were read out while a jitter was measured. The jitter was a clock jitter which was determined by analyzing read signals by a time interval analyzer to determine "signal fluctuation (σ)" and computing a value of σ/TW (%) wherein TW is a window margin. The optimum recording power/optimum erasing power that provided a minimum jitter was determined to be 5.4 mW/2.8 mW for all the samples, at which the jitter was 7.4%. It is seen from these results that all the samples had satisfactory recording/reading characteristics.

Next, these samples were stored in a hot humid environment of 80° C. and 85% RH for 50 hours. Sample Nos. 1 and 2 remained unchanged whereas in sample No. 3, separation occurred between the recording layer 4 and the second dielectric layer 32.

For each of sample Nos. 1 and 2, 1,000 disks were continuously produced and examined whether or not the second dielectric layer 32 was sound. In sample No. 2 having the second dielectric layer 32 of $CeO_2$, those disks in which the second dielectric layer 32 cracked summed to 50%. In contrast, sample No. 1 having the second dielectric layer 32 of a mixture of $CeO_2$ and $Al_2O_3$ included no disks in which the second dielectric layer 32 cracked.

Example 2

Optical recording disk samples were prepared by the same procedure as sample No. 1 except that the second dielectric layer 32 was formed of $CeO_2$—$Al_2O_3$ or $CeO_2$, the $Al_2O_3$ content in the second dielectric layer 32 was changed as shown in Table 1, and the thickness of the second dielectric layer 32 was changed as shown in Table 1. It is noted that the thickness of the second dielectric layer 32 in each sample was set such that the reflectance was identical in all the samples.

For these samples, the optimum recording power Pw which produced a minimum jitter was determined under the same conditions as in Example 1. Also, these samples were stored in a hot humid environment as in Example 1 and examined whether separation occurred between the recording layer 4 and the second dielectric layer 32 after the storage. The results are shown in Table 1.

TABLE 1

| Sample No. | $Al_2O_3$ (mol %) | Thickness (nm) | Pw (mW) | Separation |
|---|---|---|---|---|
| 4 (comparison) | — | 8.0 | 6.0 | no |
| 5 | 10 | 8.0 | 6.0 | no |
| 6 | 20 | 8.5 | 5.8 | no |
| 7 | 40 | 9.0 | 5.7 | no |
| 8 | 60 | 10.0 | 5.6 | no |
| 9 | 80 | 11.0 | 5.4 | occurred |

It is seen from Table 1 that an $Al_2O_3$ content in excess of 60 mol % imports a strong likelihood of separation between the recording layer 4 and the second dielectric layer 32. For each sample, separation was examined on ten specimens. In sample No. 9 having an $Al_2O_3$ content of 80 mol %, the frequency of separation occurrence was 4/10. By contrast, in sample No. 3 having an $Al_2O_3$ content of 100 mol %, the frequency of separation occurrence was 10/10. It is seen from these results that the preferred range of $Al_2O_3$ content is 10 to 80 mol %, especially 20 to 60 mol %.

It is also seen from Table 1 that an increased $Al_2O_3$ content leads to a lower refractive index, which allows the second dielectric layer 32 to be made thicker, resulting in an improved recording sensitivity (a lowering of optimum recording power). It is noted that all the samples shown in Table 1 had a minimum jitter of 8% or less.

When the second dielectric layer 32 was formed using composite targets containing $Cr_2O_3$, $Fe_3O_4$, $Mn_3O_4$, $Nb_2O_5$, MgO, ZnO, $TiO_2$, $Y_2O_3$, $Ta_2O_5$, $Sb_2O_3$, $ZrO_2$, $Bi_2O_3$ or $MgF_2$ instead of $Al_2O_3$, the occurrence of cracks in the second dielectric layer 32 was suppressed and no separation of the second dielectric layer 32 was observed. Especially when MgO was used, a crack inhibition effect comparable to the use of $Al_2O_3$ was observed.

INDUSTRIAL APPLICABILITY

The optical recording medium of the invention has a mixed dielectric layer containing cerium oxide and the above-specified additive compound. The mixed dielectric layer is unlikely to crack during deposition by sputtering. Even when the medium is stored under hot humid conditions, the likelihood of separation between the mixed dielectric layer and the recording layer is minimized. When the mixed dielectric layer is disposed in contact with a reflective layer made of silver or a silver-base alloy, it protects the reflective layer from corrosion. Since the refractive index of the mixed dielectric layer can be controlled over a wide range by altering the mix ratio of cerium oxide to the additive mixture, the optical design of the medium is facilitated.

Since the minimized likelihood of separation of the mixed dielectric layer from the recording layer is accomplished when the recording layer is made of a metal or alloy, the invention is especially suited for phase change optical recording media and magneto-optical recording media.

What is claimed is:

1. The optical recording medium comprising a recording layer, a mixed dielectric layer containing $CeO_2$ and $Al_2O_3$, and a reflective layer containing Ag, wherein said recording layer is in contact with said mixed dielectric layer, and said mixed dielectric layer is in contact with said reflective layer.

2. The optical recording medium of claim 1, wherein a first dielectric layer, said recording layer, and a second dielectric layer are disposed in order, and the second dielectric layer is comprised of said mixed dielectric layer.

* * * * *